US008289646B1

(12) United States Patent
Heo et al.

(10) Patent No.: US 8,289,646 B1
(45) Date of Patent: Oct. 16, 2012

(54) DISK DRIVE HAVING A DISK LIMITER THAT IS DISPOSED WITHIN AN ANGULAR RANGE RELATIVE TO A BASE DEPRESSION BRIM

(75) Inventors: Baekho Heo, San Jose, CA (US); Enoch Mylabathula, San Jose, CA (US); Jifang Tian, Fremont, CA (US); Donald Brunnett, Pleasanton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 78 days.

(21) Appl. No.: 12/822,452

(22) Filed: Jun. 24, 2010

(51) Int. Cl.
*G11B 33/14* (2006.01)
(52) U.S. Cl. .................................... 360/97.15
(58) Field of Classification Search ............ 360/97.01, 360/97.02, 97.03, 97.04, 97.15
See application file for complete search history.

(56) References Cited

U.S. PATENT DOCUMENTS

| 4,939,611 | A | 7/1990 | Connolly |
|---|---|---|---|
| 5,231,549 | A | 7/1993 | Morehouse et al. |
| 5,239,431 | A | 8/1993 | Day et al. |
| 5,453,889 | A | 9/1995 | Alt |
| 5,541,791 | A | 7/1996 | Yamasaki et al. |
| 5,625,514 | A | 4/1997 | Kubo et al. |
| 5,640,290 | A | 6/1997 | Khanna et al. |
| 5,757,587 | A | 5/1998 | Berg et al. |
| 5,801,899 | A | 9/1998 | Genheimer |
| 5,864,444 | A | 1/1999 | Baker et al. |
| 5,903,409 | A | 5/1999 | Allen et al. |
| 5,959,807 | A | 9/1999 | Jurgenson |
| 6,055,134 | A | 4/2000 | Boutaghou |
| 6,084,744 | A | 7/2000 | Genheimer et al. |
| 6,115,214 | A | 9/2000 | Allsup et al. |
| 6,137,658 | A | 10/2000 | Matsuzaki et al. |
| 6,172,843 | B1 | 1/2001 | Genheimer et al. |
| 6,215,628 | B1 | 4/2001 | Boutaghou |
| 6,226,144 | B1 | 5/2001 | Nagl et al. |
| 6,236,531 | B1 | 5/2001 | Allsup et al. |
| 6,271,987 | B1 | 8/2001 | Allsup et al. |
| 6,341,051 | B2 | 1/2002 | Hachiya et al. |
| 6,351,344 | B1 | 2/2002 | Krum et al. |
| 6,351,350 | B1 | 2/2002 | Symons et al. |
| 6,417,986 | B1 | 7/2002 | Tran et al. |
| 6,424,487 | B2 | 7/2002 | Nagl et al. |
| 6,452,753 | B1 | 9/2002 | Hiller et al. |
| 6,473,270 | B1 | 10/2002 | McDonald et al. |
| 6,477,000 | B1 | 11/2002 | Pottebaum et al. |
| 6,556,383 | B2 | 4/2003 | Murphy et al. |

(Continued)

FOREIGN PATENT DOCUMENTS

EP          1615224 B1    9/2009

*Primary Examiner* — Angel A. Castro

(57) ABSTRACT

A disk drive includes a spindle that defines a spindle rotation axis, and a disk drive base that has a base depression bounded by a first base depression brim. A disk is attached to the spindle, and the disk includes a disk outer peripheral extent. The disk drive includes a disk limiter protrusion extending over an arc of the disk outer peripheral extent that spans no more than 20° about the spindle rotation axis. According to one aspect of the invention, a first radius that extends from the spindle rotation axis over the first base depression brim is angularly disposed no more than 25° from any second radius that extends from the spindle rotation axis to the disk limiter protrusion. According to another aspect of the invention, the disk limiter protrusion may protrude from an edge of a VCM yoke top plate towards the spindle rotation axis.

19 Claims, 4 Drawing Sheets

U.S. PATENT DOCUMENTS

| | | |
|---|---|---|
| 6,624,966 B1 | 9/2003 | Ou-Yang et al. |
| 6,765,762 B2 | 7/2004 | Yanagihara |
| 6,781,791 B1 | 8/2004 | Griffin et al. |
| 6,791,790 B2 * | 9/2004 | Lee .................... 360/97.02 |
| 6,917,491 B2 | 7/2005 | Choi |
| 6,930,857 B1 | 8/2005 | Lin et al. |
| 6,961,207 B2 | 11/2005 | Kang et al. |
| 7,085,098 B1 | 8/2006 | Yang et al. |
| 7,136,246 B2 | 11/2006 | Khanna et al. |
| 7,274,537 B2 | 9/2007 | Fan et al. |
| 7,307,811 B2 | 12/2007 | Xu et al. |
| 7,310,199 B2 | 12/2007 | Pottebaum et al. |
| 7,327,530 B2 | 2/2008 | Lee et al. |
| 7,570,453 B2 | 8/2009 | Kim et al. |
| 7,602,586 B2 | 10/2009 | Kim et al. |
| 7,751,145 B1 * | 7/2010 | Lin et al. .................... 360/97.02 |
| 7,839,602 B2 | 11/2010 | Dunckley et al. |
| 7,961,426 B2 | 6/2011 | Naruse |
| 8,009,384 B1 * | 8/2011 | Little .................... 360/97.02 |
| 2001/0012174 A1 | 8/2001 | Imamura |
| 2005/0057854 A1 | 3/2005 | Khanna et al. |
| 2006/0176608 A1 | 8/2006 | Xu et al. |
| 2007/0081269 A1 | 4/2007 | Kim et al. |
| 2011/0255190 A1 | 10/2011 | Lee et al. |

* cited by examiner

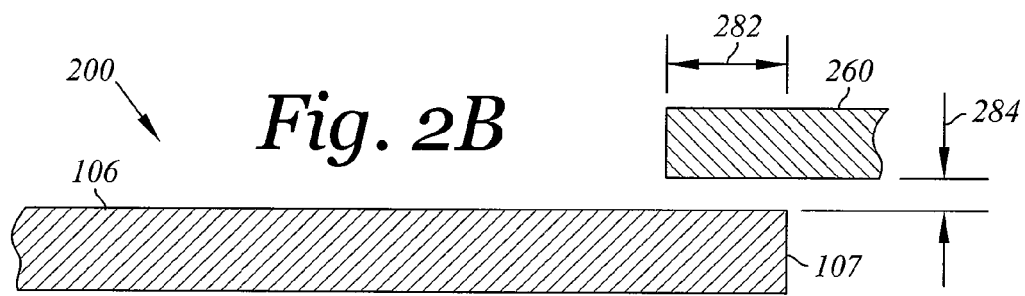
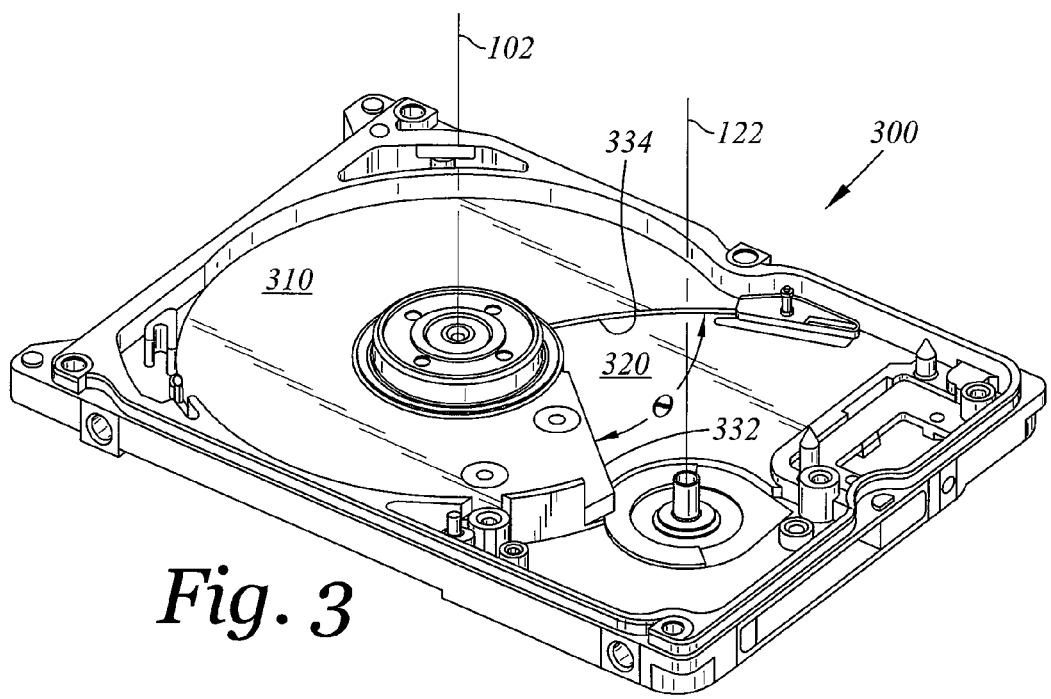

DISK DRIVE HAVING A DISK LIMITER THAT IS DISPOSED WITHIN AN ANGULAR RANGE RELATIVE TO A BASE DEPRESSION BRIM

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes electronics and firmware for controlling the rotation of the spindle motor, for controlling the position of the HSA, and for providing a data transfer channel between the disk drive and its host.

The head stack assembly typically includes an actuator, at least one head gimbal assembly (HGA), and a flex cable assembly. Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on an adjacent disk surface.

During operation of the disk drive, the actuator must rotate to position the heads adjacent desired information tracks on the disk. One or more actuator arms extend from the actuator body. An actuator coil is supported by the actuator body opposite the actuator arms. The actuator coil is configured to interact with one or more fixed magnets in the HDA, typically a pair, to form a voice coil motor. Many modern HDAs include a ramp adjacent the disk outer periphery. To prevent the heads from sliding off of the outer edge of the disk before they are properly unloaded, a portion of the ramp (that engages a lift tab of each HGA) typically must extend over the disk outer periphery.

If the disk drive is subjected to a mechanical shock, the disk(s) may still deflect significantly. Such disk deflection may be limited by contact between the disk(s) and the ramp, and/or other components such as the disk drive cover, and/or the disk drive base plate. Still, such limiting contact may be undesirable depending on the characteristics of the component being contacted by the disk. For example, the base plate and/or cover may have features against which disk contact is undesirable and could cause disk surface damage and associated loss of user data.

Moreover, typical specifications for mechanical shock robustness in the disk drive industry are becoming more stringent, especially for disk drives designed for mobile applications. To meet such specifications the disk drive must be able to survive more severe mechanical shocks. More severe shocks may cause impact between one or more disks and a feature of the disk drive base and/or the disk drive cover for which contact is undesirable, despite the existence of a nominal clearance between the two. Furthermore, the nominal clearance may not be practically increased to the extent necessary to prevent such impacts because of dimensional constraints and/or operational considerations (e.g. desired damping of disk vibration from close proximity of a large region of the disk surface to an adjacent region of the disk cover and/or base plate.

Thus, there is a need in the art for a disk drive design having an improved structure for limiting disk deflection in response to mechanical shocks.

BRIEF DESCRIPTION OF THE DRAWINGS

FIG. 2B is a side view of a portion of the disk drive shown in FIG. 2A.
FIG. 3 is a perspective view of a disk drive base, capable of use in an embodiment of the present invention.

DESCRIPTION OF THE PREFERRED EMBODIMENTS

Figure 1A:
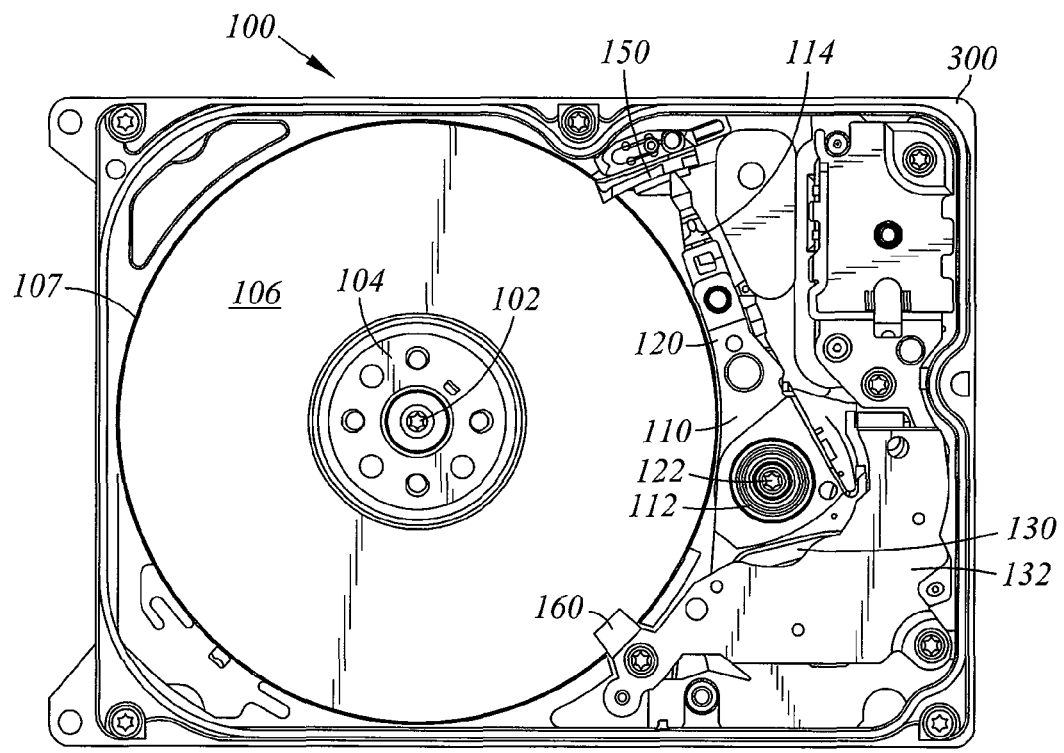
FIG. 1A is a top view of a disk drive according to an embodiment of the present invention.
Figure 1B:
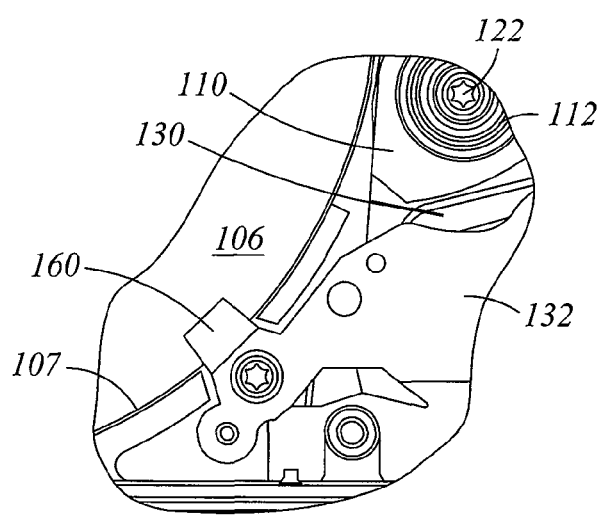
FIG. 1B is an enlarged view of a portion of FIG. 1A.

FIG. 1A is a top view of a disk drive 100 according to an embodiment of the present invention. FIG. 1B is an enlarged top view of a portion of disk drive 100. The disk drive comprises a disk drive base 300 and a spindle 104 attached to the disk drive base 300. The spindle 104 defines a spindle axis of rotation 102 (normal to the page in FIG. 1A). A disk 106 has a top surface and an opposing bottom surface and is mounted on spindle 104. In contemporary magnetic hard disk drive applications, the disk 106 may comprise an aluminum, glass, or ceramic substrate, with the substrate being coated with a NiP under-layer, a thin-film magnetic layer, a diamond-like amorphous carbon protective layer, and a very thin lubricant layer. The disk 106 defines a disk outer peripheral extent 107. In certain embodiments, the disk drive 100 of FIG. 1 may include a plurality of disks that are mounted on spindle 104. For example, disk 106 may be a top disk below which one or more additional disks may be mounted on the spindle 104.

An actuator 110 is attached to the disk drive base 300. The actuator 110 is typically fabricated from aluminum, magnesium, beryllium, or stainless steel, and pivots about a pivot bearing 112 that is inserted as a cartridge into a bore in the actuator. The pivot bearing 112 is typically retained in the bore by a C-clip or tolerance ring but may be otherwise retained (e.g. by an adhesive). The actuator 110 defines an actuator pivot axis 122 at the location of the pivot bearing 112. The actuator pivot axis 122 is substantially parallel to the spindle rotation axis 102 (normal to the page in FIGS. 1A and 1B). The actuator 110 includes at least one actuator arm 120 that extends away from the actuator pivot axis 122, and an actuator coil 130 that extends away from the actuator pivot axis 122 in a direction generally opposite the actuator arm 120.

A portion of the actuator coil 130 is obscured behind a top plate 132 of a yoke structure of a voice coil motor (VCM) in the views of FIGS. 1A and 1B. The top plate 132 may support an upper permanent magnet of the VCM, and may be disposed over a bottom plate (not shown because obscured by the top plate 132 in the views of FIGS. 1A and 1B) that may support a lower permanent magnet of the VCM. The top plate 132 and/or the bottom plate form a yoke and preferably comprise a ferromagnetic metal so as to provide a return path for magnetic flux from the permanent magnet(s). The ferromagnetic metal yoke structure including the top plate 132 is preferably affixed to the disk drive base, for example by an adhesive, one or more fasteners, and/or magnetic attraction.

In the embodiment of FIG. 1A, a head gimbal assembly (HGA) 114 is attached to the actuator 110 and may support a read head near its distal end. The HGA 114 may also include a lift-tab at its distal end, that is in contact with a parking surface of a head loading ramp 150 (that is affixed to the disk drive base 300) with the disk drive 100 in a non-operational state. Specifically, at the beginning of a period of non-operation of the disk drive 100, the actuator 110 swings the HGA 114 away from the spindle 104 and beyond the outer peripheral extent 107 of disk 106. The lift-tab of the HGA 114 then contacts the ramp 150 to separate or "unload" the read head from the surface of the disk 106. After such unloading, the ramp 150 and its parking surface support the distal end of the HGA 114, rather than the disk 106 providing such support.

The ramp 150 optionally but preferably includes a HGA motion-limiting feature to protect the HGA 114 from damage during a mechanical shock event that might occur during periods of non-operation of the disk drive 100. Such a feature is designed to interfere with extreme motions of the head and/or suspension assembly while the lift-tab of the HGA 114 resides in the parking region of the ramp 150. For example, such a HGA motion limiting feature may prevent head-to-head contact between HGAs in response to mechanical shock and/or may reduce the risk of a vertical deflection of HGA 114 that might exceed its elastic range.

The ramp 150 may be fabricated from any suitable material having acceptable cost, dimensional stability, and tribological characteristics, although a material that can be injection molded is preferred. For example, the ramp 150 may comprise polyoxymethylene (POM), polycarbonate, a liquid crystal polymer (LCP), nylon, an acetal resin plastic or acetyl homopolymer, and/or polyetherimide, among other materials.

In the embodiment of FIGS. 1A and 1B, a disk limiter protrusion 160 protrudes from an edge of the VCM yoke top plate 132 towards the spindle rotation axis 102. The disk limiter protrusion 160 extends over the disk outer peripheral extent 107 in the non-operational state. In this context, extending "over" refers to an overlap as viewed parallel with the actuator pivot axis 122 (i.e. the disk limiter protrusion 160 extends closer to the spindle rotation axis 102 than is the disk outer peripheral extent 107). For example, the disk limiter protrusion 160 preferably extends over the disk outer peripheral extent 107 by a radial overlap distance (measured radially with respect to the spindle axis of rotation 102) in the range 0.1 mm to 2 mm.

In certain embodiments, the VCM yoke top plate 132 and the disk limiter protrusion 160 are a single component with material continuity rather than being an assembly of subcomponents. However, alternatively the disk limiter protrusion 160 may be a distinct sub-component that is conventionally fastened or adhered to the VCM yoke top plate 132, for example by a threaded fastener. In the embodiment of FIGS. 1A and 1B, a face of the disk limiter protrusion 160 is preferably spaced, in a direction parallel to the actuator pivot axis 122, between 0.3 mm and 0.8 mm from a surface of the disk 106. In certain embodiments, the foregoing dimensions may advantageously enhance the robustness of hard disk drives to mechanical shocks that may occur under non-operating conditions.

In the embodiment of FIGS. 1A-1B, the head loading ramp 150 also extends over the disk outer peripheral extent 107. However, no stationary structure fixed to the disk drive base 300, except the head loading ramp 150 and the disk limiter protrusion 160, extends over the disk outer peripheral extent 107 with a spacing, measured in a direction parallel to the spindle rotation axis, that is less than 0.8 mm.

Figure 2A:
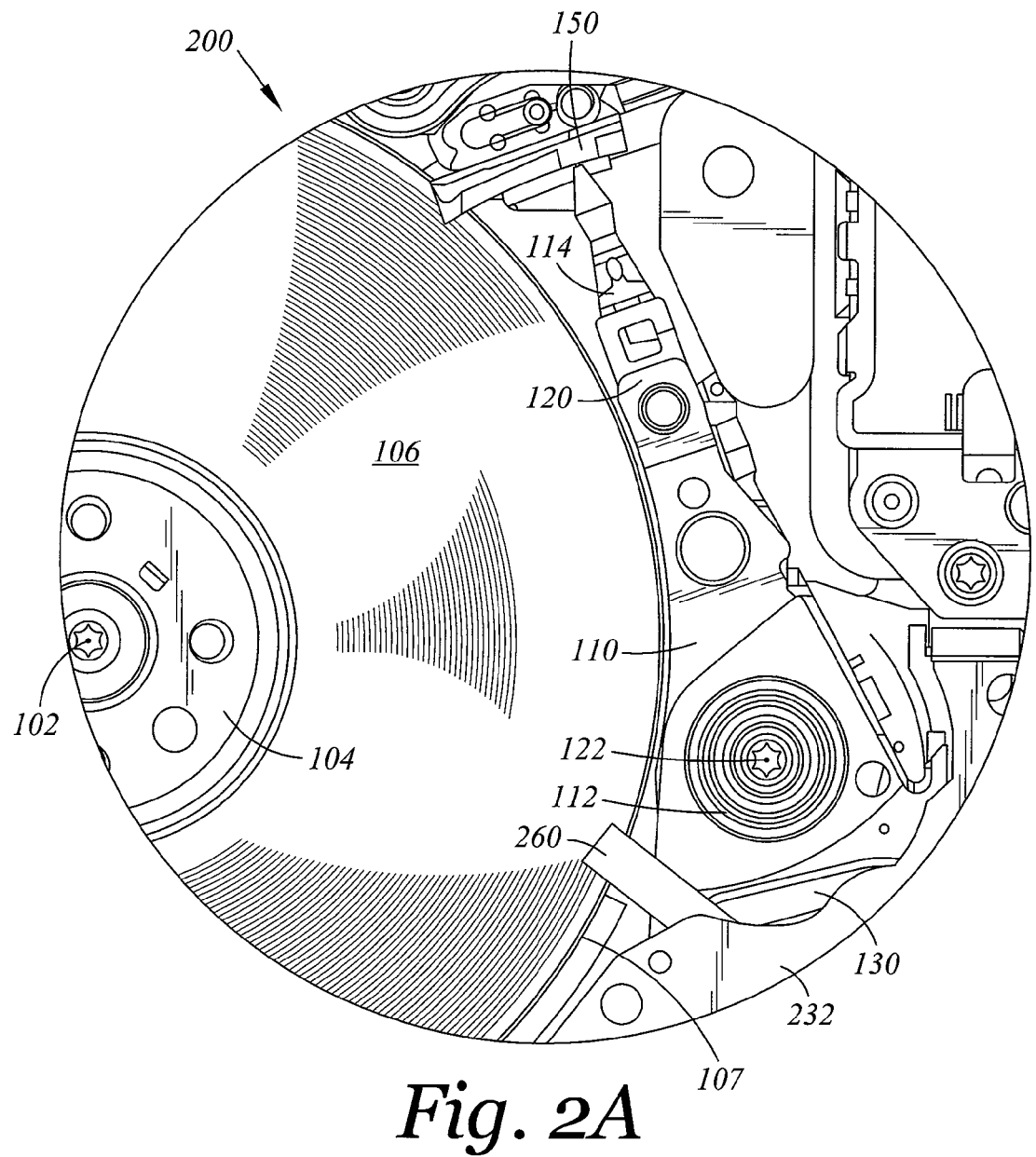
FIG. 2A is an enlarged top view of a portion of a disk drive according to an embodiment of the present invention.

FIG. 2A is an enlarged top view of a portion of a disk drive 200 according to an embodiment of the present invention. FIG. 2B is a side view of a portion of the disk drive 200 shown in FIG. 2A. Like numerical labels are used to identify like components in the figure descriptions herein, for example to make the description of FIGS. 2A-2B more concise by not having to repeat the description of features that are similar to a previously described embodiment. In the embodiment of FIGS. 2A-2B, a disk limiter protrusion 260 protrudes from a edge of a VCM yoke top plate 232 towards the spindle rotation axis 102. The disk limiter protrusion 260 extends over the disk outer peripheral extent 107 in the non-operational state. For example, the disk limiter protrusion 260 preferably extends over the disk outer peripheral extent 107 by a radial overlap distance 282 (measured radially with respect to the spindle axis of rotation 102) in the range 0.1 mm to 2 mm.

In certain embodiments, the VCM yoke top plate 232 and the disk limiter protrusion 260 are a single component with material continuity rather than being an assembly of subcomponents. However, alternatively the disk limiter protrusion 260 may be a distinct sub-component that is conventionally fastened or adhered to the VCM yoke top plate 232. In the embodiment of FIGS. 2A-2B, a face of the disk limiter protrusion 260 is preferably spaced, by a clearance 284 measured in a direction parallel to the actuator pivot axis 122, between 0.3 mm and 0.8 mm from a surface of the disk 106. In certain embodiments, the foregoing dimensions may advantageously enhance the robustness of hard disk drives to mechanical shocks that may occur under non-operating conditions.

FIG. 3 is a perspective view of a disk drive base 300, capable of use in an embodiment of the present invention. Now referring additionally to FIG. 3, the disk drive base 300 includes a first base surface 310 that faces the disk (e.g. disk 106 of FIG. 1). The disk drive base 300 also includes a base depression 320 that faces the disk but that is disposed further from the disk than is the first base surface 310. The base depression 320 is bounded by a first base depression brim 332, and a second base depression brim 334, which are each disposed between the first base surface 310 and the base depression 320. In certain embodiments, the first base depression brim 332 may be spaced, in a direction parallel to the spindle rotation axis 102, less than 0.8 mm from a surface of the disk 106.

In the embodiment of FIG. 3, the first base depression brim 332 is oriented generally radially with respect to the spindle rotation axis 102. That is, although the first base depression brim 332 is not oriented perfectly radially with respect to the spindle rotation axis 102, its orientation is much nearer to being radial than tangential. Likewise in the embodiment of FIG. 3, the second base depression brim 334 is also oriented generally radially with respect to spindle rotation axis 102. An angle θ about the spindle axis of rotation 102 is may be formed between an imaginary radius that extends from the spindle rotation axis 102 over the first base depression brim 332, and another imaginary radius that extends from the spindle rotation axis 102 over the second base depression brim 334. That is, an angle θ may be formed about the spindle axis of rotation 102 between the first base depression brim 332 and the second base depression brim 334, so that θ is the angular span of the base depression 320 about the spindle axis of rotation 102. In certain embodiments, the angle θ may be 90 degrees or less.

By contrast, the angular span of the disk limiter protrusion 160, that extends over an arc of the disk outer peripheral extent 107 in FIGS. 1A and 1B, is no more than 20° about the spindle rotation axis 102. Likewise, the angular span of the disk limiter protrusion 260, that extends over an arc of the disk outer peripheral extent 107 in FIGS. 2A-2B, is no more than 20° about the spindle rotation axis 102. Preferably, a first imaginary radius that extends from the spindle rotation axis 102 over the first base depression brim 332 is angularly disposed no more than 25° from any second imaginary radius that extends from the spindle rotation axis 102 to the disk limiter protrusion (e.g. disk limiter protrusion 160 of FIG. 1B or disk limiter protrusion 260 of FIGS. 2A-2B).

In certain embodiments, the foregoing angular inequalities may desirably help the limiter protrusions 160 and 260 to constrain the disk 106 in such a way that less of the energy from mechanical shocks excites a disk umbrella mode response (with perhaps more energy exciting a disk and/or spindle rocking response). The foregoing angular inequalities may also desirably avoid contact between the disk 106 and the first base depression brim 332 under conditions of mechanical shock.

Figure 4A:
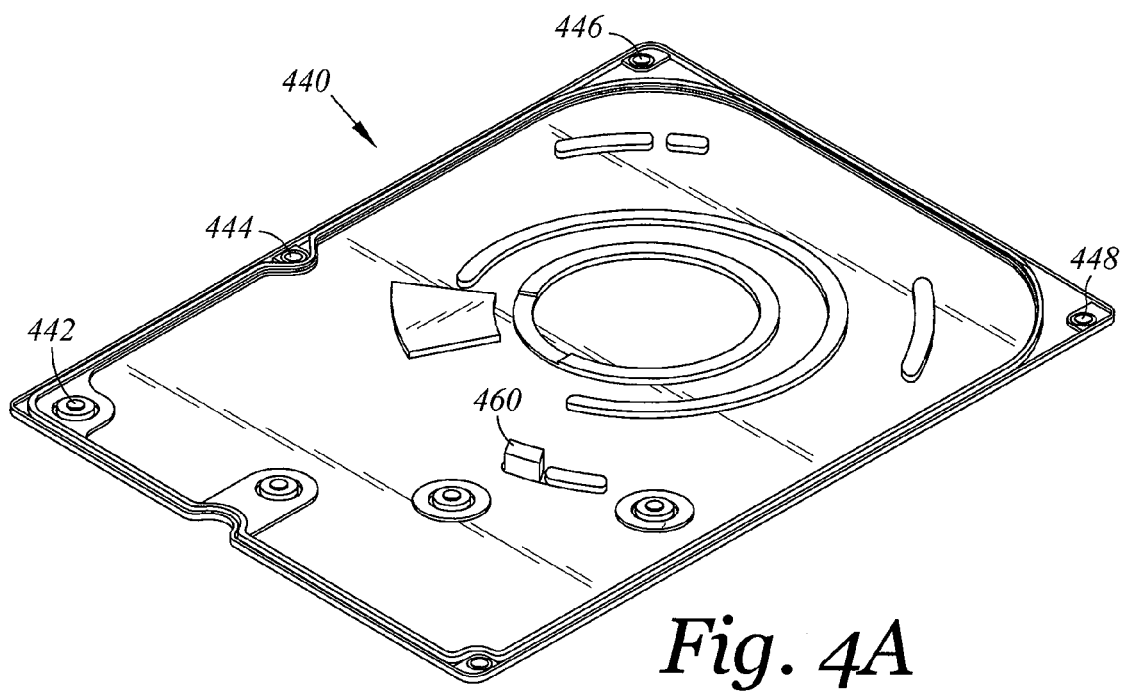
FIG. 4A is an underside perspective view of a disk drive top cover, according to an embodiment of the present invention.
Figure 4B:
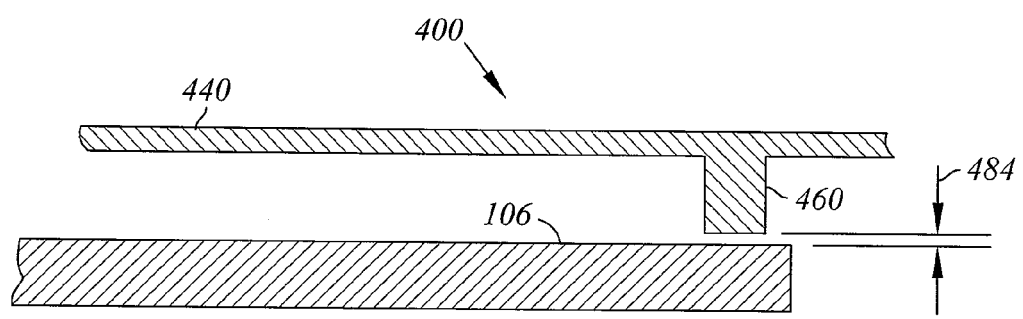
FIG. 4B is a side view of a portion of a disk drive that includes the top cover of FIG. 4A.

FIG. 4A is an underside perspective view of a disk drive top cover 440, according to an embodiment of the present invention. FIG. 4B is a side view of a portion of a disk drive 400 that includes the top cover 440 of FIG. 4A. Now referring to FIGS. 4A and 4B, the top cover 440 may be affixed to a disk drive base (e.g. the disk drive base 300 of FIG. 3), for example by fasteners through the holes 442, 444, 446, and 448 that are shown in the periphery of the top cover 440, to comprise a disk drive enclosure.

The top cover 440 may also include a disk limiter protrusion 460 that protrudes into the disk drive enclosure towards a disk 106. In certain embodiments, the disk limiter protrusion 460 and the top cover 440 may be a single component with material continuity rather than being an assembly of subcomponents. Alternatively, the disk limiter protrusion 460 may be a subcomponent that is attached to the top cover 440, for example by conventional adhesive or conventional fastener. In the embodiment of FIGS. 4A-4B, a face of the disk limiter protrusion 460 is preferably spaced, by a clearance 484 measured in a direction parallel to the actuator pivot axis, between 0.3 mm and 0.8 mm from a surface of the disk 106. In certain embodiments, the foregoing dimensional range may advantageously enhance the robustness of hard disk drives to mechanical shocks that may occur under non-operating conditions.

Now referring to FIGS. 3, 4A, and 4B, the angular span of the disk limiter protrusion 460 about the disk rotational axis (e.g. disk rotational axis 102 of FIG. 3), is preferably no more than 20°. A first imaginary radius that extends from the spindle rotation axis 102 over the first base depression brim 332 is preferably angularly disposed no more than 25° from any second imaginary radius that extends from the spindle rotation axis 102 to the disk limiter protrusion 460 (with the top cover 440 righted and attached to the disk drive base 300). In certain embodiments, the foregoing angular inequalities may desirably help the disk limiter protrusion 460 constrain the disk 106 in such a way that less of the energy from mechanical shocks excites a disk umbrella mode response (with perhaps more energy exciting a disk and/or spindle rocking response). The foregoing angular inequalities may also desirably avoid contact between the disk 106 and the first base depression brim 332 under conditions of mechanical shock.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. The terms "comprising," "including," and "having," as used herein, are intended to be read as open-ended terms.

We claim:

1. A disk drive comprising:
   a disk drive base having a base depression bounded by a first base depression brim;
   a spindle attached to the disk drive base and defining a spindle rotation axis;
   a first disk attached to the spindle, the first disk including a disk outer peripheral extent;
   a disk limiter protrusion extending over an arc of the disk outer peripheral extent that spans no more than 20° about the spindle rotation axis;
   wherein a first radius that extends from the spindle rotation axis over the first base depression brim is angularly disposed no more than 25° from any second radius that extends from the spindle rotation axis to the disk limiter protrusion.

2. The disk drive of claim 1 wherein the disk drive further comprises a ferromagnetic metal yoke structure and a permanent magnet supported by the ferromagnetic metal yoke structure, the ferromagnetic metal yoke structure being affixed to the disk drive base and including a yoke top plate that is fixed with respect to the disk drive base, wherein the disk limiter protrusion protrudes from an edge of the yoke top plate towards the spindle rotation axis.

3. The disk drive of claim 2 wherein disk limiter protrusion and the yoke top plate are a single component with material continuity rather than being an assembly of subcomponents.

4. The disk drive of claim 2 wherein the disk limiter protrusion is fastened to the yoke top plate by a threaded fastener.

5. The disk drive of claim 1 further comprising a top cover that is affixed to the disk drive base, and wherein the disk limiter protrusion protrudes from the top cover towards the first disk.

6. The disk drive of claim 5 wherein the disk limiter protrusion and the top cover are a single component with material continuity rather than being an assembly of subcomponents.

7. The disk drive of claim 1 wherein the disk limiter protrusion extends over the disk outer peripheral extent by a radial overlap distance that is at least 0.1 mm but no more than 2 mm.

8. The disk drive of claim 1 wherein the base depression is also bounded by a second base depression brim, and wherein the first radius that extends from the spindle rotation axis over the first base depression brim is angularly disposed no more than 90 degrees from a third radius that extends from the spindle rotation axis over the second base depression brim.

9. The disk drive of claim 8 wherein the second base depression brim is oriented generally radially with respect to the spindle rotation axis.

10. The disk drive of claim 1 wherein the first base depression brim is oriented generally radially with respect to the spindle rotation axis.

11. The disk drive of claim 1 wherein a face of the disk limiter protrusion is disposed between 0.3 mm and 0.8 mm from a surface of the first disk.

12. The disk drive of claim 1 wherein the first base depression brim is spaced, in a direction parallel to the spindle rotation axis, less than 0.8 mm from a surface of the first disk.

13. The disk drive of claim 1 further comprising a head loading ramp affixed to the disk drive base and extending over the disk outer peripheral extent, and wherein no stationary structure fixed to the disk drive base, except the head loading ramp and the disk limiter protrusion, extends over the disk outer peripheral extent with a spacing, measured in a direction parallel to the spindle rotation axis, that is less than 0.8 mm.

14. A disk drive comprising:

a disk drive base;

a spindle attached to the disk drive base and defining a spindle rotation axis;

a first disk attached to the spindle, the first disk including a disk outer peripheral extent;

a ferromagnetic metal yoke structure and a permanent magnet supported by the ferromagnetic metal yoke structure, the ferromagnetic metal yoke structure being affixed to the disk drive base and including a yoke top plate that is fixed with respect to the disk drive base; and a disk limiter protrusion protruding from an edge of the yoke top plate towards the spindle rotation axis and extending over the disk outer peripheral extent.

15. The disk drive of claim 14 wherein the disk limiter protrusion extends over the disk outer peripheral extent by a radial overlap distance that is at least 0.1 mm but no more than 2 mm.

16. The disk drive of claim 14 wherein a face of the disk limiter protrusion is disposed between 0.3 mm and 0.8 mm from a surface of the first disk.

17. The disk drive of claim 14 wherein the disk limiter protrusion and the yoke top plate are a single component with material continuity rather than being an assembly of subcomponents.

18. The disk drive of claim 14 wherein the disk limiter protrusion is fastened to the yoke top plate by a threaded fastener.

19. The disk drive of claim 14 further comprising a head loading ramp affixed to the disk drive base and extending over the disk outer peripheral extent, and wherein no stationary structure fixed to the disk drive base, except the head loading ramp and the disk limiter protrusion, extends over the disk outer peripheral extent with a spacing, measured in a direction parallel to the spindle rotation axis, that is less than 0.8 mm.

* * * * *